US012798604B2

(12) United States Patent
Hotta et al.

(10) Patent No.: US 12,798,604 B2
(45) **Date of Patent: *Nov. 17, 2026**

(54) DISPLAY CONTROL DEVICE FOR DISPLAYING MARKS BETWEEN A VIRTUAL ORIGIN AND A DETECTED TARGET, DISPLAY DEVICE, DISPLAY SYSTEM FOR A VEHICLE, DISPLAY CONTROL METHOD AND NON-TRANSITORY STORAGE MEDIUM FOR THE SAME

(71) Applicant: TOYOTA JIDOSHA KABUSHIKI KAISHA, Toyota (JP)

(72) Inventors: Norihisa Hotta, Nagoya (JP); Toshinori Aoki, Toyota (JP); Takahiro Hirota, Kota-cho (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 8 days.

This patent is subject to a terminal disclaimer.

(21) Appl. No.: 19/200,841

(22) Filed: May 7, 2025

(65) Prior Publication Data

US 2025/0263090 A1 Aug. 21, 2025

Related U.S. Application Data

(63) Continuation of application No. 18/317,150, filed on May 15, 2023, now Pat. No. 12,344,267.

(30) Foreign Application Priority Data

Jun. 16, 2022 (JP) ................................ 2022-097652

(51) Int. Cl.

*G08B 21/00* (2006.01)
*B60K 35/00* (2006.01)

(Continued)

(52) U.S. Cl.

CPC ............. *B60W 50/14* (2013.01); *B60K 35/00* (2013.01); *B60K 35/10* (2024.01); *B60K 35/215* (2024.01);

(Continued)

(58) Field of Classification Search

CPC ........... B60W 50/14; B60W 2050/146; B60W 2540/225; B60W 2554/4041;

(Continued)

(56) References Cited

U.S. PATENT DOCUMENTS

2016/0082840 A1* 3/2016 Yoshida ................. B60K 35/23 701/36
2017/0330463 A1* 11/2017 Li .......................... G08G 1/166

(Continued)

FOREIGN PATENT DOCUMENTS

JP 2018106655 A 7/2018
JP 2021-037916 A 3/2021
WO 2017056211 A1 4/2017

OTHER PUBLICATIONS

Norihisa Hotta et al., U.S. Appl. No. 18/317,150, filed May 15, 2023.

(Continued)

*Primary Examiner* — Mark S Rushing
(74) *Attorney, Agent, or Firm* — Dickinson Wright, PLLC

(57) ABSTRACT

A display control device comprises a memory and a processor coupled to the memory. The processor is configured to acquire positional information about a target based on detection information of a target detection section that detects the target in surroundings of a vehicle, set a virtual origin in an output range of an output section that outputs an image to a display area provided in a cabin of the vehicle, set a hypothetical line connecting the virtual origin to a position of the positional information, and generate, based (Continued)

on the hypothetical line, a mark that urges caution toward the target and that is overlay displayed on the display area.

12 Claims, 12 Drawing Sheets

(51) Int. Cl.

| | |
|---|---|
| ***B60K 35/10*** | (2024.01) |
| ***B60K 35/215*** | (2024.01) |
| ***B60K 35/28*** | (2024.01) |
| ***B60K 35/60*** | (2024.01) |
| ***B60K 35/81*** | (2024.01) |
| ***B60W 50/14*** | (2020.01) |
| *B60K 35/29* | (2024.01) |

(52) U.S. Cl.
CPC .............. *B60K 35/28* (2024.01); *B60K 35/60* (2024.01); *B60K 35/81* (2024.01); *B60K 35/29* (2024.01); *B60K 2360/149* (2024.01); *B60K 2360/178* (2024.01); *B60K 2360/785* (2024.01); *B60W 2050/146* (2013.01); *B60W 2540/225* (2020.02); *B60W 2554/4041* (2020.02); *B60W 2554/4045* (2020.02)

(58) Field of Classification Search
CPC ........... B60W 2554/4045; B60K 35/00; B60K 35/10; B60K 35/215; B60K 35/28; B60K 35/60; B60K 35/81; B60K 35/29; B60K 2360/149; B60K 2360/178; B60K 2360/785; B60K 35/235; B60R 1/001; B60R 1/24; B60R 16/02
USPC ........................................................ 340/425.5
See application file for complete search history.

(56) References Cited

U.S. PATENT DOCUMENTS

| | | | | |
|---|---|---|---|---|
| 2018/0180880 | A1 | 6/2018 | Katagiri et al. | |
| 2020/0286292 | A1* | 9/2020 | Kondo | B60K 35/10 |
| 2021/0268961 | A1* | 9/2021 | Asami | B60R 1/24 |
| 2022/0118983 | A1* | 4/2022 | Yagyu | B60K 35/10 |

OTHER PUBLICATIONS

Norihisa Hotta et al., U.S. Appl. No. 18/317,150, Non-Final Office Action issued Sep. 25, 2024.
Norihisa Hotta et al., U.S. Appl. No. 18/317,150, Notice of Allowance issued Mar. 19, 2025.

* cited by examiner

DISPLAY CONTROL DEVICE FOR DISPLAYING MARKS BETWEEN A VIRTUAL ORIGIN AND A DETECTED TARGET, DISPLAY DEVICE, DISPLAY SYSTEM FOR A VEHICLE, DISPLAY CONTROL METHOD AND NON-TRANSITORY STORAGE MEDIUM FOR THE SAME

CROSS-REFERENCE TO RELATED APPLICATION

This application is a continuation of U.S. patent application Ser. No. 18/317,150, filed May 15, 2023, which is based on and claims priority under 35 USC 119 from Japanese Patent Application No. 2022-097652 filed on Jun. 16, 2022, the disclosure of which is incorporated by reference herein.

BACKGROUND

Technical Field

The present disclosure relates to a display control device, a display device, a display system, a vehicle, a display control method, and a non-transitory storage medium.

Related Art

In a hitherto known display device such as a head up display, a virtual image of an augmented reality (AR) image is overlay displayed on a scene in front of a vehicle by projecting an image onto a windshield or the like of the vehicle.

For example, in technology disclosed in Japanese Patent Application Laid-Open (JP-A) No. 2021-037916, relative position information of a notification target acquired using a detection information acquisition section is employed to draw a shape extending from a main image section in a straight line thin band toward the notification target outside an image. This thereby suggests the relative position of the notification target outside the image in a manner easily understood by the driver.

In display devices such as head up displays and the like, there is a demand to appropriately transmit information about a detected target in cases in which the target has been detected outside the image. The technology disclosed in JP-A No. 2021-037916 is technology to address this issue by simply drawing a shape extending in a straight line thin band toward the notification target outside the image, and there is room for improvement from the perspective of appropriately transmitting information about a detected target in cases in which the target has been detected outside the image being displayed in a display area.

SUMMARY

The present disclosure appropriately transmits information about a detected target in cases in which the target has been detected outside an image being displayed in a display area.

A display control device according to a first aspect includes a positional information acquisition section that acquires positional information about a target based on detection information of a target detection section that detects the target in surroundings of a vehicle, a virtual origin setting section that sets a virtual origin in an output range of an output section that outputs an image to a display area provided in a cabin of the vehicle, a hypothetical line setting section that sets a hypothetical line connecting the virtual origin to a position of the positional information acquired by the positional information acquisition section, and a mark generation section that generates, based on the hypothetical line, a mark that urges caution toward the target and that is overlay displayed on the display area.

In the display control device according to the first aspect, the mark that urges caution toward the target is overlay displayed based on the hypothetical line connecting the virtual origin set in the output range of the output section and the position of the target, such that the mark that urges caution toward the target is overlay displayed on the display area even in cases in which the target has been detected by the target detection section outside the output range of the output section. Information about a direction the detected target is present in is accordingly overlay displayed on the display area in cases in which the target has been detected outside the output range of the output section.

As a result thereof, the presence of a target outside the output range of the output section can be transmitted to an occupant appropriately. The output range of the output section referred to here is an range of an image displayable on the display area.

A display control device according to a second aspect is the display control device of the first aspect, wherein the mark generation section generates plural of marks on the hypothetical line.

In the display control device according to the second aspect the plural marks are overlay displayed toward the target by the plural marks being generated on the hypothetical line. This accordingly enables the marks to indicate the direction the target is present in. As a result this enables information about the direction in which the target is present to be transmitted appropriately.

A display control device according to a third aspect is the display control device of the first aspect or the second aspect, wherein the mark generation section generates the mark at a position near to the virtual origin so as to be larger than the mark at a position far from the virtual origin.

In the display control device according to the third aspect the mark at a position near to the virtual origin is generated so as to be larger than the mark at a far position, such that this is a mark that expresses a sense of depth (sense of perspective). This accordingly enables information about a direction the target is present in to be transmitted more appropriately.

A display control device according to a fourth aspect is the display control device of any one of the first aspect to the third aspect wherein the virtual origin setting section sets a position offset from an eyepoint of an occupant of the vehicle in a forward direction of the vehicle as the virtual origin.

In the display control device according to the fourth aspect, the virtual origin is set at a position offset from the eyepoint of the occupant in the vehicle forward direction, and so this enables the virtual origin to be set based on the eyepoint of the occupant. The hypothetical line is accordingly also set according to the eyepoint of the occupant. As a result the mark can be overlay displayed at an appropriate position on the display area according to the eyepoint of the occupant.

The display control device according to a fifth aspect is the display control device of any one of the first aspect to the fourth aspect wherein the mark generation section generates at least one of the mark at a position offset from the virtual origin toward a position of the positional information acquired by the positional information acquisition section and lying in an output range.

In the display control device according to the fifth aspect, the at least one mark is generated at the position offset from the virtual origin and lying inside the output range of the output section, such that the at least one mark is overlay displayed on the display area in cases in which the target is present at the outside of the output range of the output section. This accordingly enables information about a direction the detected target is present in to be transmitted in cases in which the target is present outside the output range of the output section.

A display control device according to a sixth aspect is the display control device of any one of the first aspect to the fifth aspect wherein the mark generation section generates the mark at either left or right with respect to the virtual origin.

In the display control device according to the sixth aspect, the mark is displayed at the right side with respect to the virtual origin in cases in which the target is at the vehicle right side outside the output range of the output section. The mark is displayed at the left side with respect to the virtual origin in cases in which the target is at the vehicle left side outside the output range of the output section. This accordingly means that information about whether the target is in a direction toward the vehicle right side or the vehicle left side is known at a glance. As a result thereof, the speed can be raised with which the occupant is aware of the direction in which the target is present outside the output range of the output section.

A display control device according to a seventh aspect is the display control device of any one of the first aspect to the sixth aspect wherein the mark generation section generates the mark as a 3D arrow indicating a direction of the target.

In the display control device according to the seventh aspect a 3D arrow toward the target is overlay displayed by generating the mark as a 3D arrow. This enables information about the direction in which the target is present to be transmitted more appropriately.

A display control device according to an eighth aspect is the display control device of any one of the first aspect to the seventh aspect, further including a size detection section that detects a size of the target, and the mark generation section generates the mark based on the size of the target as detected by the size detection section.

In the display control device according to the eighth aspect, due to the mark being generated based on the size of the target, for example, a mark with a large lateral width is employed in cases in which the target has a large lateral width, such as vehicle. However, a mark with a small lateral width is employed in cases in which the target has a small lateral width, such as a person. This accordingly enables the mark to have a size according to the size of the target. As a result information can be transmitted about the size of the target outside the output range of the output section.

A display device according to a ninth aspect includes the display control device of any one of the first aspect to the eighth aspect, the output section that outputs the image, and the display area provided in the cabin of the vehicle, on which an image output by the output section is overlay displayed.

In the display device according to the ninth aspect, the presence of a target outside the output range of the output section can be transmitted to the occupant appropriately.

A display system according to a tenth aspect includes the display device of the ninth aspect, and the target detection section that detects the target in the surroundings of the vehicle and has a detection range wider than the output range output by the output section.

In the display system according to the tenth aspect a presence of a target outside the output range of the output section can be transmitted to the occupant appropriately.

A vehicle according to an eleventh aspect includes the display system of the tenth aspect, and a windshield that configures the display area.

In the vehicle according to the eleventh aspect, due to the mark being displayed on the display area of the windshield, the occupant is aware of the mark when in a state gazing forward. The occupant is accordingly able to be aware of the mark during driving without shifting from the forward gaze.

A display control method executed by a processor according to a twelfth aspect includes acquiring positional information about a target based on detection information of a target detection section that detects the target in surroundings of a vehicle, setting a virtual origin in an output range of an output section that outputs an image to a display area provided in a cabin of the vehicle, setting a hypothetical line connecting the virtual origin to a position of the positional information, and generating, based on the hypothetical line, a mark that urges caution toward the target and that is overlay displayed on the display area.

The display control method executed by a processor according to the twelfth aspect enables the presence of a target outside the output range of the output section to be transmitted to the occupant appropriately.

A non-transitory storage medium according to a thirteenth aspect is storing a program executable by a processor to perform display control processing. The processing includes acquiring positional information about a target based on detection information of a target detection section that detects the target in surroundings of a vehicle, setting a virtual origin in an output range of an output section that outputs an image to a display area provided in a cabin of the vehicle, setting a hypothetical line connecting the virtual origin to a position of the positional information, and generating, based on the hypothetical line, a mark that urges caution toward the target and that is overlay displayed on the display area.

The non-transitory storage medium according to the thirteen aspect enables the presence of a target outside the output range of the output section to be transmitted to the occupant appropriately.

The present disclosure enables information about a detected target to be transmitted appropriately in cases in which the target has been detected outside an image being displayed on a display area.

BRIEF DESCRIPTION OF THE DRAWINGS

Exemplary embodiments of the present invention will be described in detail based on the following figures, wherein.

DETAILED DESCRIPTION

First Exemplary Embodiment

Description follows regarding a display system according to a first exemplary embodiment, with reference to the drawings. Note that an arrow FR in FIG. 1 indicates a vehicle forward direction, and an arrow RH indicates a vehicle right side. Moreover, in the first exemplary embodiment an example will be described in which a vehicle 10 is traveling at a velocity V in the vehicle forward direction.

Configuration of Display System Installed Vehicle

Figure 1:
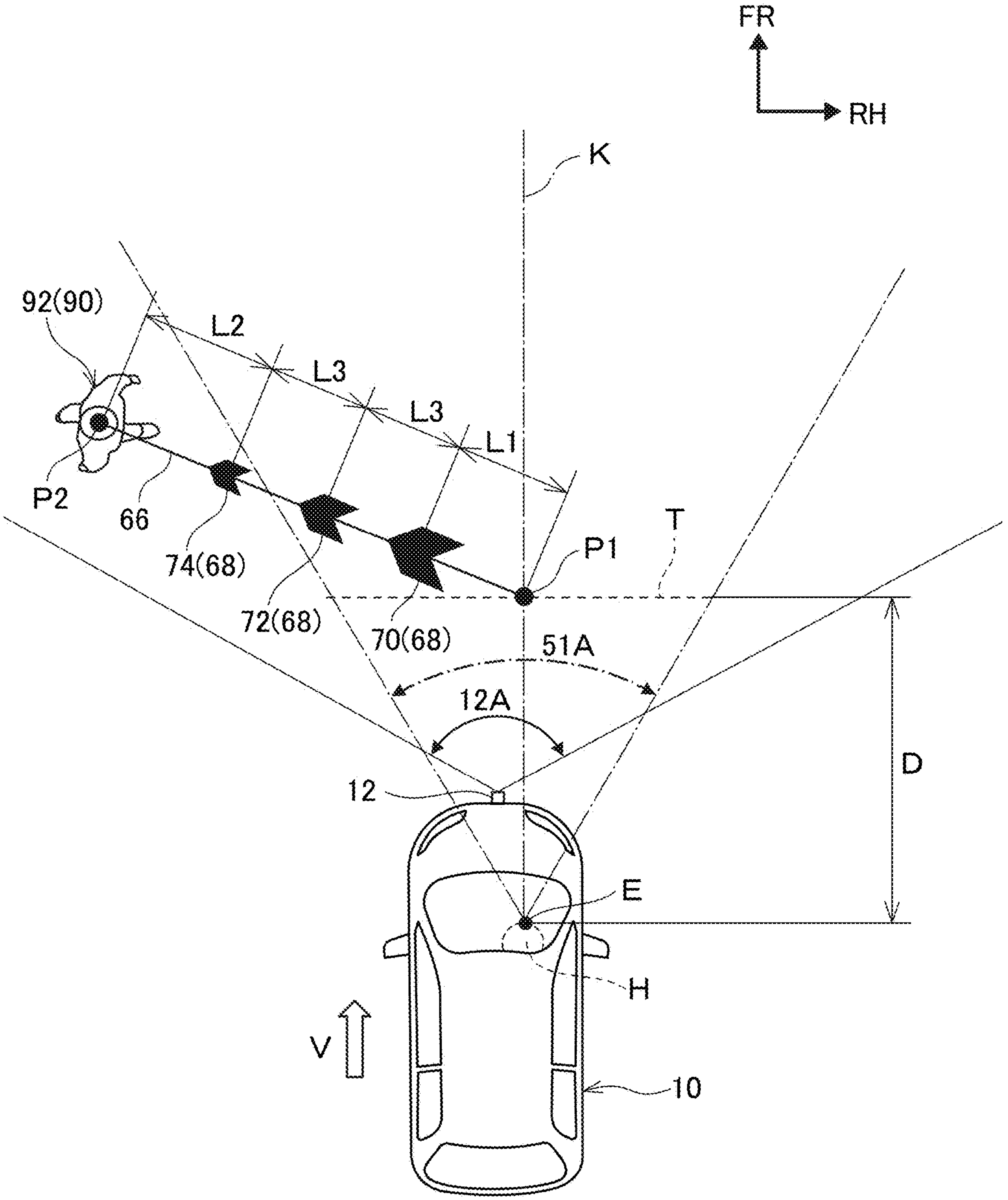
FIG. 1 is a bird's eye view illustrating a vehicle installed with a display system according to a first exemplary embodiment, and is a diagram illustrating a case in which a target is outside a projection range of a projection section.

As illustrated in FIG. 1, in the vehicle 10 a camera 12 is provided as a target detection section. The camera 12 is attached to a bumper at a front side of the vehicle 10, and is able to image in the vehicle forward direction. The camera 12 is configured to have an imaging range 12A as a detection range.

A pedestrian 92 (see FIG. 1) and a bus 94 (see FIG. 10) may be taken as examples of a target 90. Moreover, a vehicle ahead traveling in front of the vehicle, an oncoming vehicle traveling in the opposing traffic lane, a vehicle that has parked up, or other obstruction may also be taken as examples of the target 90.

Figure 2:
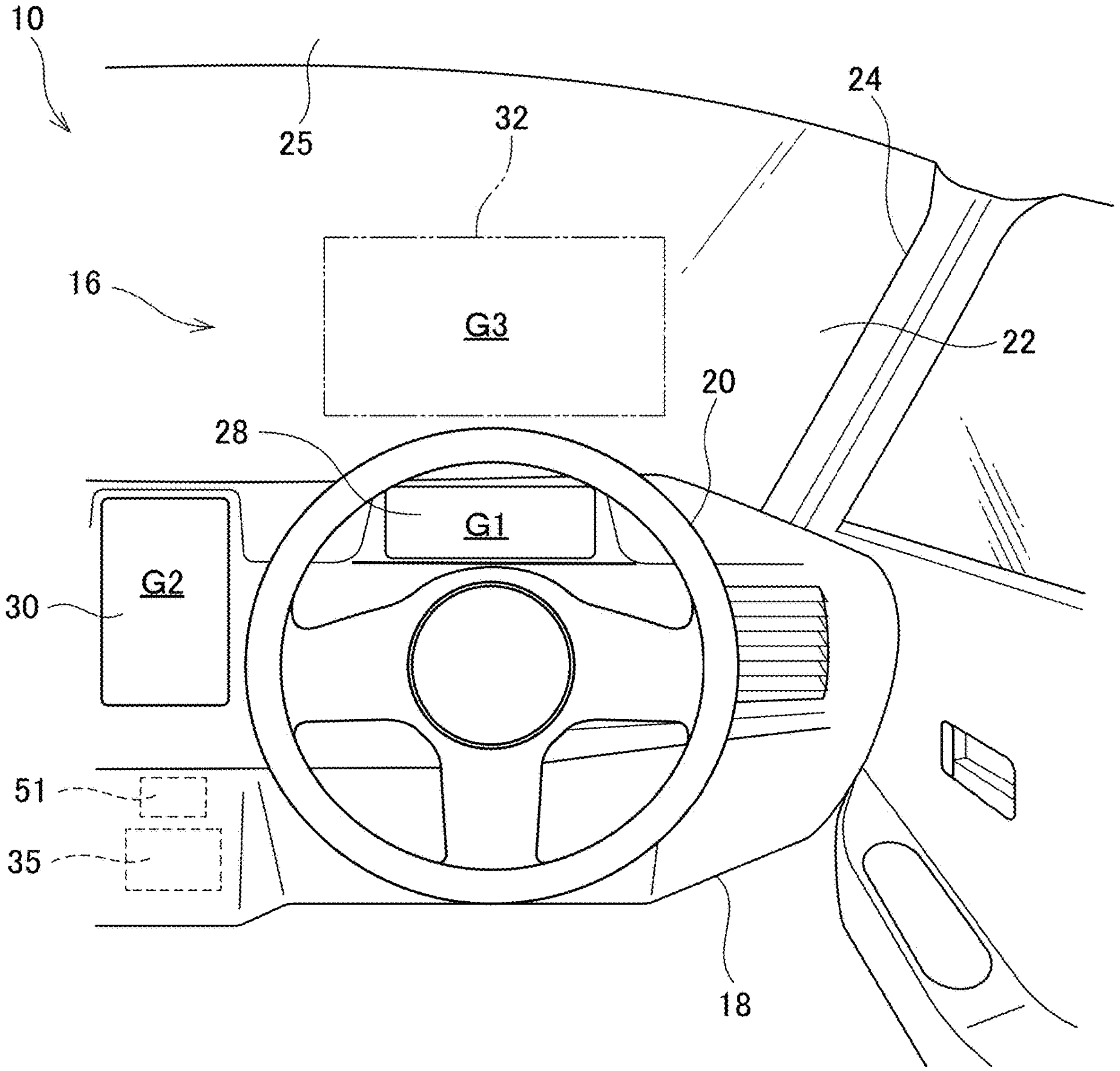
FIG. 2 is a schematic diagram illustrating a vehicle installed with a display system according to the first exemplary embodiment, and is a view of a front side of the vehicle from inside the vehicle cabin.

As illustrated in FIG. 2, an instrument panel 18 and a windshield 22 are provided at a front side of a vehicle cabin of the vehicle 10.

Instrument Panel 18

The instrument panel 18 is provided extending along a vehicle width direction. A steering wheel 20 is provided at a vehicle right side of the instrument panel 18. Namely, in the first exemplary embodiment, as an example, the vehicle 10 is configured as a right hand drive vehicle in which the steering wheel 20 is provided on the vehicle right side.

The instrument panel 18 is provided with a first display section 28 serving as an output section and including a first display area G1 serving as a display area, and a second display section 30 serving as an output section and including a second display area G2 serving as a display area.

The first display section 28 is disposed on the vehicle right side of the instrument panel 18 and at a vehicle forward direction side of the steering wheel 20. The first display section 28 is, for example, configured as a meter display on which a speedometer to show the traveling velocity, a direction indicator, a warning or the like are displayed.

The second display section 30 is disposed at a vehicle width direction center of the instrument panel 18. The second display section 30 is, for example, configured as a center display for displaying an image output from a navigation system.

Windshield 22

The windshield 22 is supported by front pillars 24. The front pillars 24 are respectively disposed at the vehicle right side and vehicle left side at a vehicle front side of the vehicle cabin, and extend in directions substantially along a vehicle height direction. An upper end of the windshield 22 is covered by a head lining 25 attached to a roof panel.

A third display section 32 including a third display area G3 serving as a display area is provided on the windshield 22.

Based on information output from a display control device 35 inbuilt to the instrument panel 18, an image projected from a projection section 51 serving as an output section is projected onto the third display section 32 of the windshield 22. An image is thereby overlay displayed as a virtual image on a virtual image plane T (see FIG. 1) ahead of an occupant (driver) H.

A display device 34 equipped with the display control device 35, the projection section 51, and the third display section 32 configures a head up display device. The third display section 32 onto which the image from the projection section 51 is projected configures a projection surface of the head up display device.

As illustrated in FIG. 1, the projection section 51 has a projection range 51A narrower than the imaging range 12A of the camera 12. The projection range 51A, as output range, of the projection section 51, as an output section, is configured about an eyepoint E of the occupant H as the origin. A distance D from the eyepoint E of the occupant H to the virtual image plane T may, for example, be set at 20 m. Note that the distance D from the eyepoint E of the occupant H to the virtual image plane T may be modified as appropriate according to the vehicle in which the display device 34 is installed.

Figure 3:
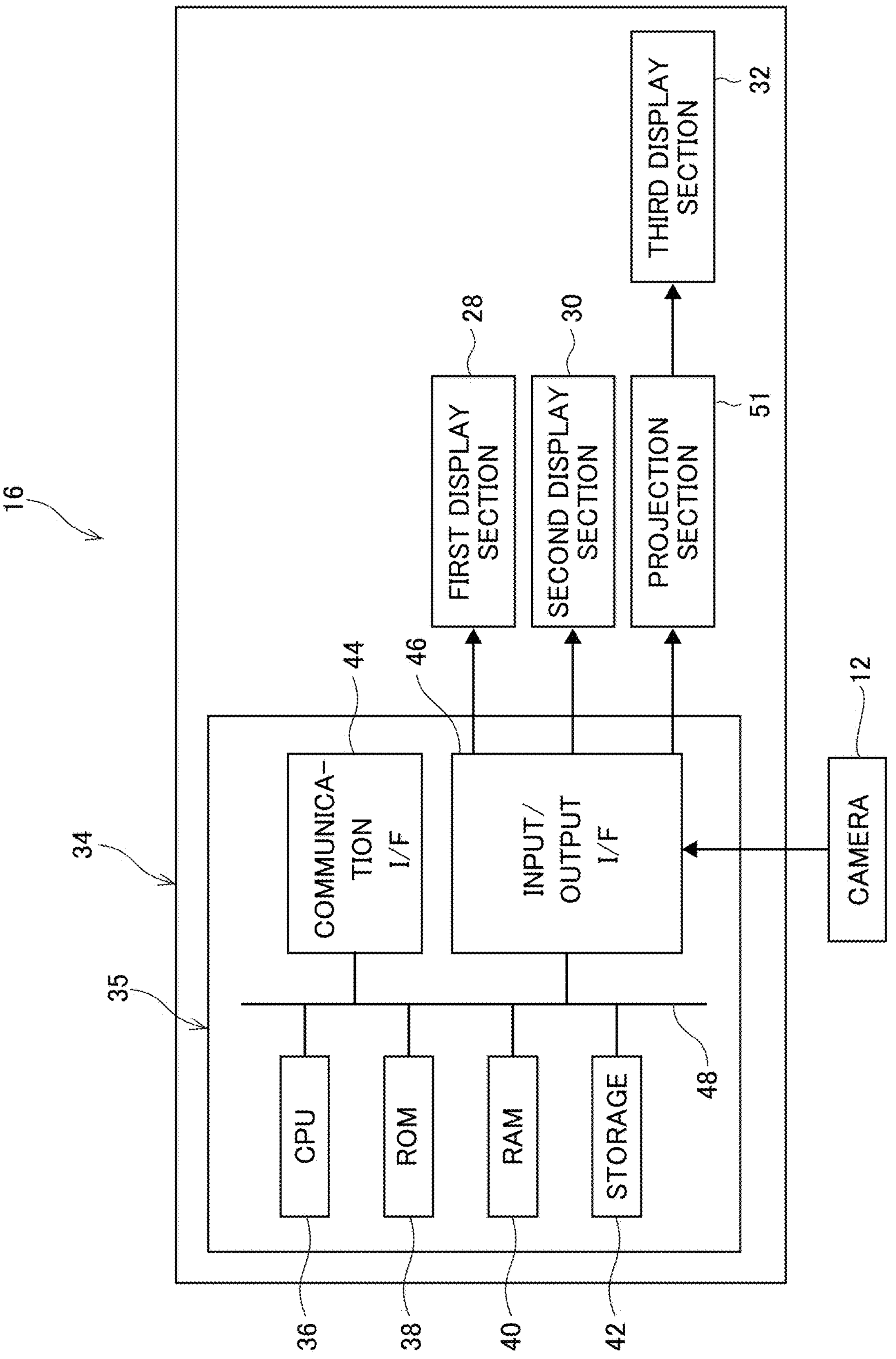
FIG. 3 is a block diagram illustrating a hardware configuration of a display system according to the first exemplary embodiment.

As illustrated in FIG. 3, the display device 34 and the camera 12 configure a display system 16.

Display System Hardware Configuration

As illustrated in FIG. 3, the display system 16 is configured such that a camera image imaged by the camera 12 is input to the display control device 35, and such that processing information processed by the display control device 35 is output to the first display section 28, the second display section 30, and the projection section 51.

The camera 12 images ahead of the vehicle. A camera image imaged by the camera 12 ahead of the vehicle is input to the display control device 35.

The display control device 35 is configured as an electronic control unit (ECU) that performs various controls. The display control device 35 is configured including a central processing unit (CPU) 36, read only memory (ROM) 38, random access memory (RAM) 40, storage 42, a communication interface (communication I/F) 44, and an input/output interface (input/output I/F) 46. Each configuration element is connected to a bus 48 so as to enable communication with each other.

The CPU 36 is a central processing unit that executes various programs and controls each section. Namely, the CPU 36 serves as a processor, reads a program from the ROM 38 serving as memory or from the storage 42 serving as memory, and executes the program using the RAM 40 as workspace. Moreover, the CPU 36 controls each of the above configuration elements and performs various computational processing according to the program recorded in the ROM 38 or the storage 42.

The ROM 38 is stored with various programs and various data. The RAM 40 serves as workspace to temporarily store a program and/or data. The storage 42 is configured by a hard disk drive (HDD) or solid state drive (SSD), and is a non-transitory recording medium stored with various programs including an operating system, and various data. In the first exemplary embodiment, a program and the like for performing display processing, described later, is stored in the ROM 38 or the storage 42.

The first display section 28, the second display section 30, the projection section 51, and the camera 12 are connected to the input/output interface 46.

Display Control Device Functional Configuration

Description follows regarding functionality of the display control device 35 of the first exemplary embodiment.

Figure 4:
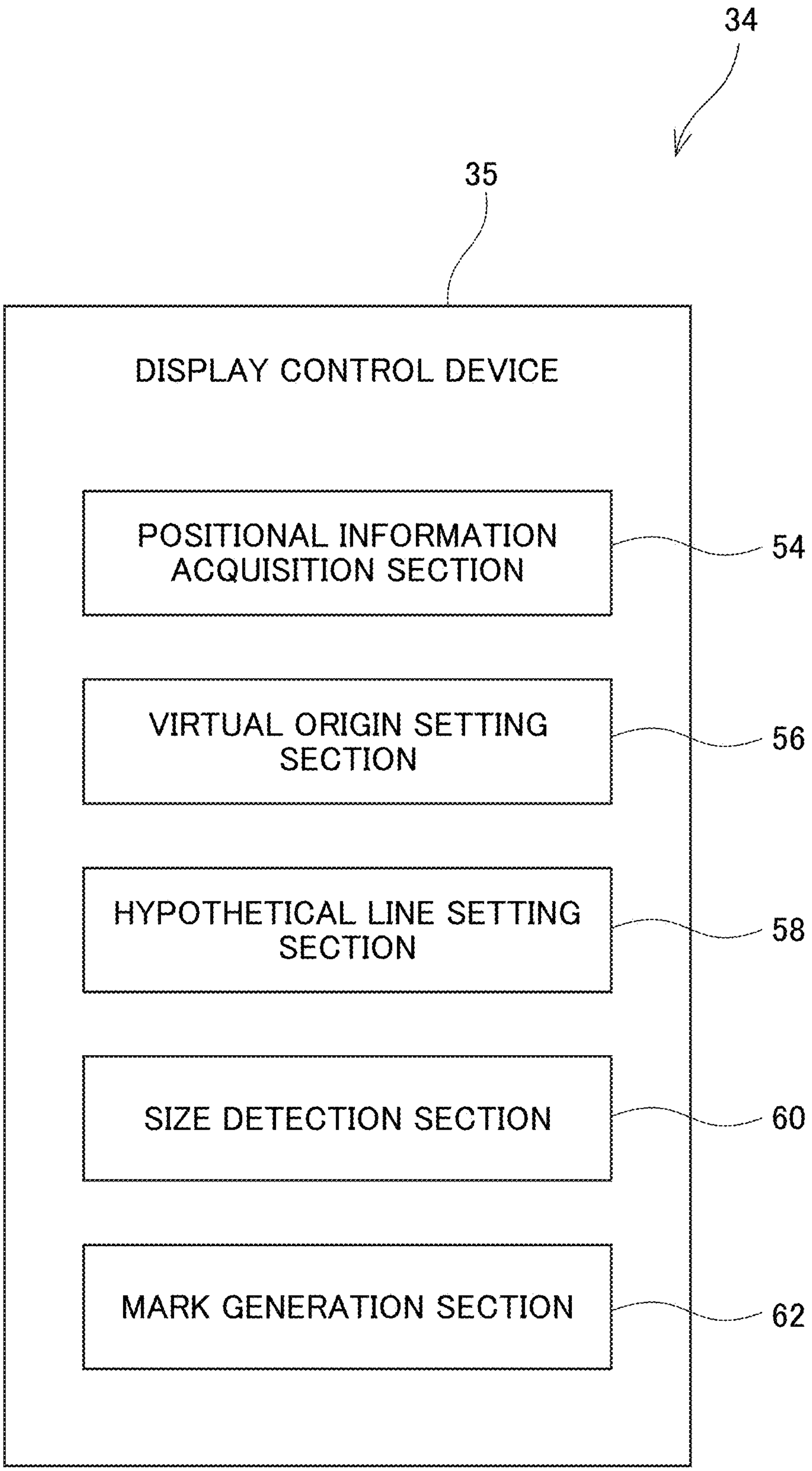
FIG. 4 is a block diagram illustrating a functional configuration of a display control device according to the first exemplary embodiment.

As illustrated in FIG. 4, the display control device 35 is configured functionally by a positional information acquisition section 54, a virtual origin setting section 56, a hypothetical line setting section 58, a size detection section 60, and a mark generation section 62. Note that each functional configuration illustrated in FIG. 4 is, for example, implemented by the CPU 36 executing a program stored in the ROM 38 or the storage 42.

Positional Information Acquisition Section

The positional information acquisition section 54 acquires positional information of a target 90 ahead of the vehicle 10 based on a camera image of the target 90 imaged by the camera 12.

More specifically, as illustrated in FIG. 1, the positional information acquisition section 54 acquires a position P2 of a pedestrian 92 outside the projection range 51A of the projection section 51 based on the camera image of the pedestrian 92 imaged by the camera 12. Moreover, as illustrated in FIG. 5, the positional information acquisition section 54 acquires a position P2 of a pedestrian 92 inside the projection range 51A of the projection section 51 based on the camera image of the pedestrian 92 imaged by the camera 12.

Virtual Origin Setting Section

The virtual origin setting section 56 sets a virtual origin P1 inside the projection range 51A of the projection section 51 narrower than the imaging range 12A of the camera 12.

Figure 5:
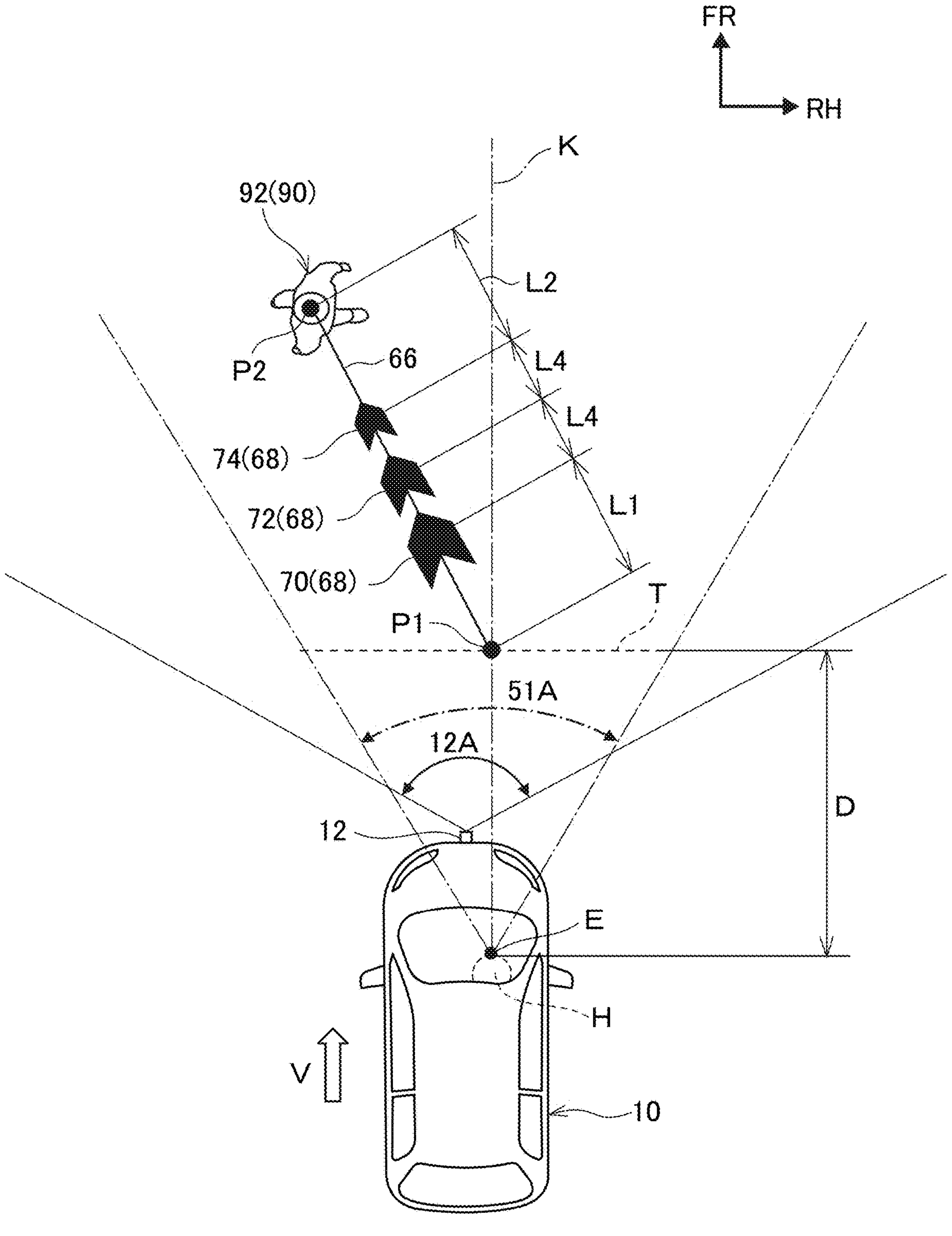
FIG. 5 is a bird's eye view illustrating a vehicle installed with a display system according to the first exemplary embodiment, and is a diagram illustrating a case in which a target is in a projection range of a projection section.

More specifically, as illustrated in FIG. 1 and FIG. 5, the virtual origin setting section 56 sets, as a virtual origin P1, a position offset by a distance D from the eyepoint E of the occupant H of the vehicle 10 in the vehicle forward direction.

Note that the virtual origin P1 may be set as an intersection of a straight line K extending from the eyepoint E of the occupant H in the vehicle 10 ahead of the vehicle where it intersects with the virtual image plane T.

Hypothetical Line Setting Section

The hypothetical line setting section 58 sets a hypothetical line connecting the virtual origin P1 to the position P2 acquired by the positional information acquisition section 54. More specifically, as illustrated in FIG. 1 and FIG. 5, the hypothetical line setting section 58 sets a hypothetical line 66 connecting the virtual origin P1 to the position P2 of the pedestrian 92.

Note that the position P2 of the pedestrian 92 may be a point on a horizontal plane including the virtual origin P1. In other words, the virtual origin P1 and the position P2 of the pedestrian 92 may be set at the same height as each other.

Size Detection Section

The size detection section 60 detects a size of the target 90. More specifically, the size detection section 60 detects the size of the target 90 captured in a camera image imaged by the camera 12 based on the camera image. The size detection section 60 is able to detect at least one information from out of a width, height, or length of the target 90 captured in the camera image.

Mark Generation Section

The mark generation section 62 generates marks 68 (see FIG. 1) to urge caution toward the target 90 based on the hypothetical line 66. The mark 68 to urge caution toward the target 90 are marks indicating the position of the target 90.

Pedestrian Outside Projection Range Of Projection Section

More specifically in cases in which the pedestrian 92 is outside the projection range 51A of the projection section 51, as illustrated in FIG. 1, the mark generation section 62 generates a first mark 70 serving as the mark 68 at a position offset by a distance L1 from the virtual origin P1 in a direction toward the position P2 acquired by the positional information acquisition section 54 and lying inside the projection range 51A of the projection section 51.

The mark generation section 62 generates a third mark 74 serving as the mark 68 at a position offset by a distance L2 from the position P2 acquired by the positional information acquisition section 54 in a direction toward the virtual origin P1.

The mark generation section 62 generates a second mark 72 serving as the mark 68 at a position offset by a distance L3 from the first mark 70 in a direction toward the position P2 acquired by the positional information acquisition section 54, which is also a position offset by the distance L3 from the third mark 74 in a direction toward the virtual origin P1.

Namely, the mark generation section 62 generates plural marks 68 at uniform spacings along the hypothetical line 66.

As illustrated in FIG. 3, the image information of the marks 68 generated by the mark generation section 62 is output to the projection section 51, and an image projected from the projection section 51 is projected onto the third display section 32 of the windshield 22.

Figure 6:
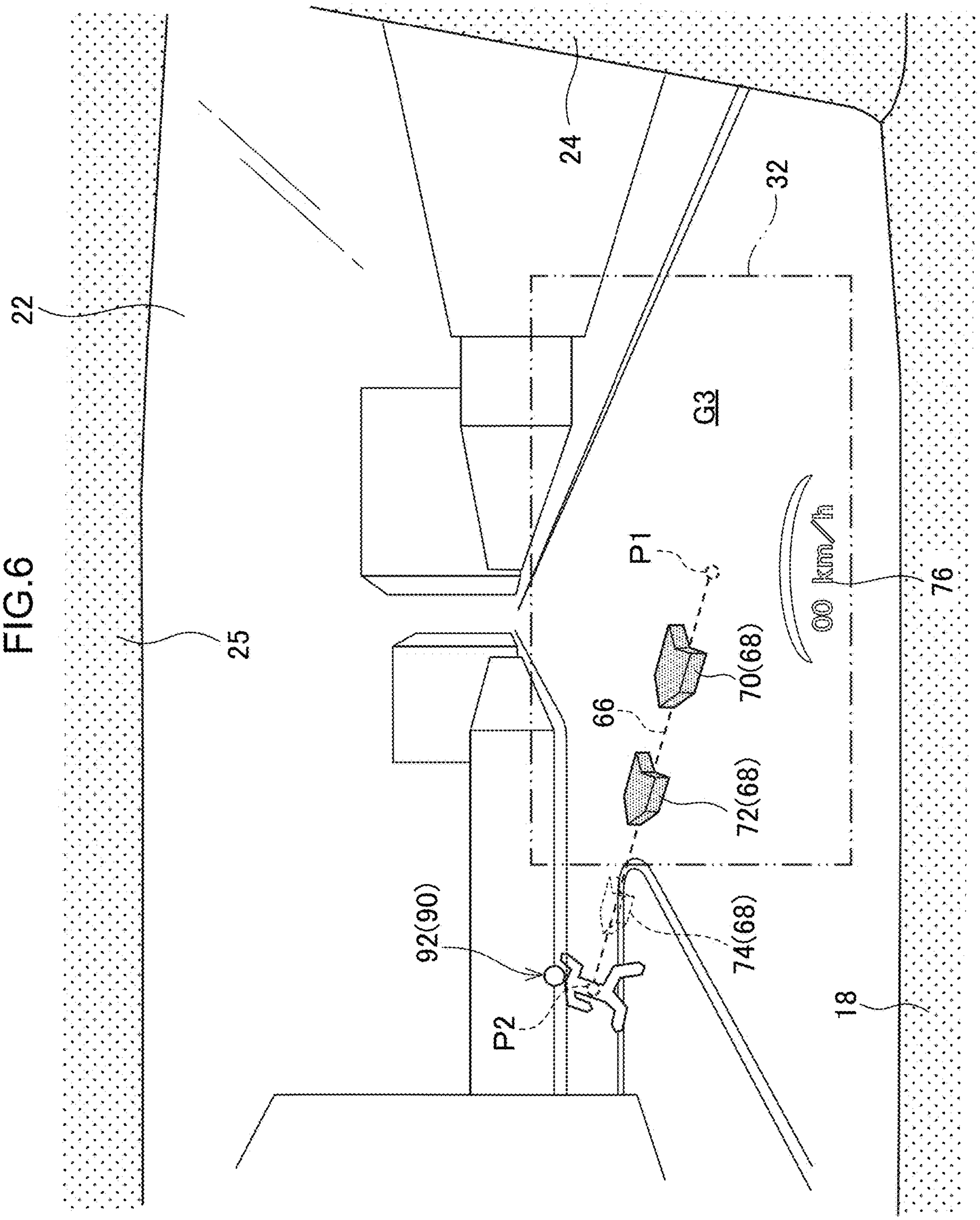
FIG. 6 is a diagram illustrating an example of a display on a display area of a display device according to the first exemplary embodiment, and is a diagram illustrating a case in which a target is outside a projection range of a projection section.

More specifically in cases in which the pedestrian 92 is outside the projection range 51A of the projection section 51, as illustrated in FIG. 6, the first mark 70 and the second mark 72 are overlay displayed as virtual images on the third display area G3 of the third display section 32. Namely, the first mark 70 and the second mark 72 are overlay displayed as virtual images on a forward scene of the windshield 22. Note that although the virtual origin P1, the hypothetical line 66, and the third mark 74 are illustrated with broken lines for reference in FIG. 6, this information may actually be omitted from display.

Pedestrian In Projection Range Of Projection Section

In cases in which the pedestrian 92 is inside the projection range 51A of the projection section 51, as illustrated in FIG. 5, the mark generation section 62 generates a first mark 70 serving as the mark 68 at a position offset by a distance L1 from the virtual origin P1 in a direction toward the position P2 acquired by the positional information acquisition section 54 and inside the projection range 51A of the projection section 51.

The mark generation section 62 generates a third mark 74 serving as the mark 68 at a position offset by a distance L2 from the position P2 acquired by the positional information acquisition section 54 in a direction toward the virtual origin P1.

The mark generation section 62 generates a second mark 72 serving as the mark 68 at a position offset by the distance LA from the first mark 70 in a direction toward the position P2 acquired by the positional information acquisition section 54, which is also a position offset by a distance L4 from the third mark 74 in a direction toward the virtual origin P1.

Namely, the mark generation section 62 generates plural marks 68 at uniform spacings along the hypothetical line 66. Moreover, the mark generation section 62 changes a distance between the plural marks 68 according to a distance to the target 90.

Figure 7:
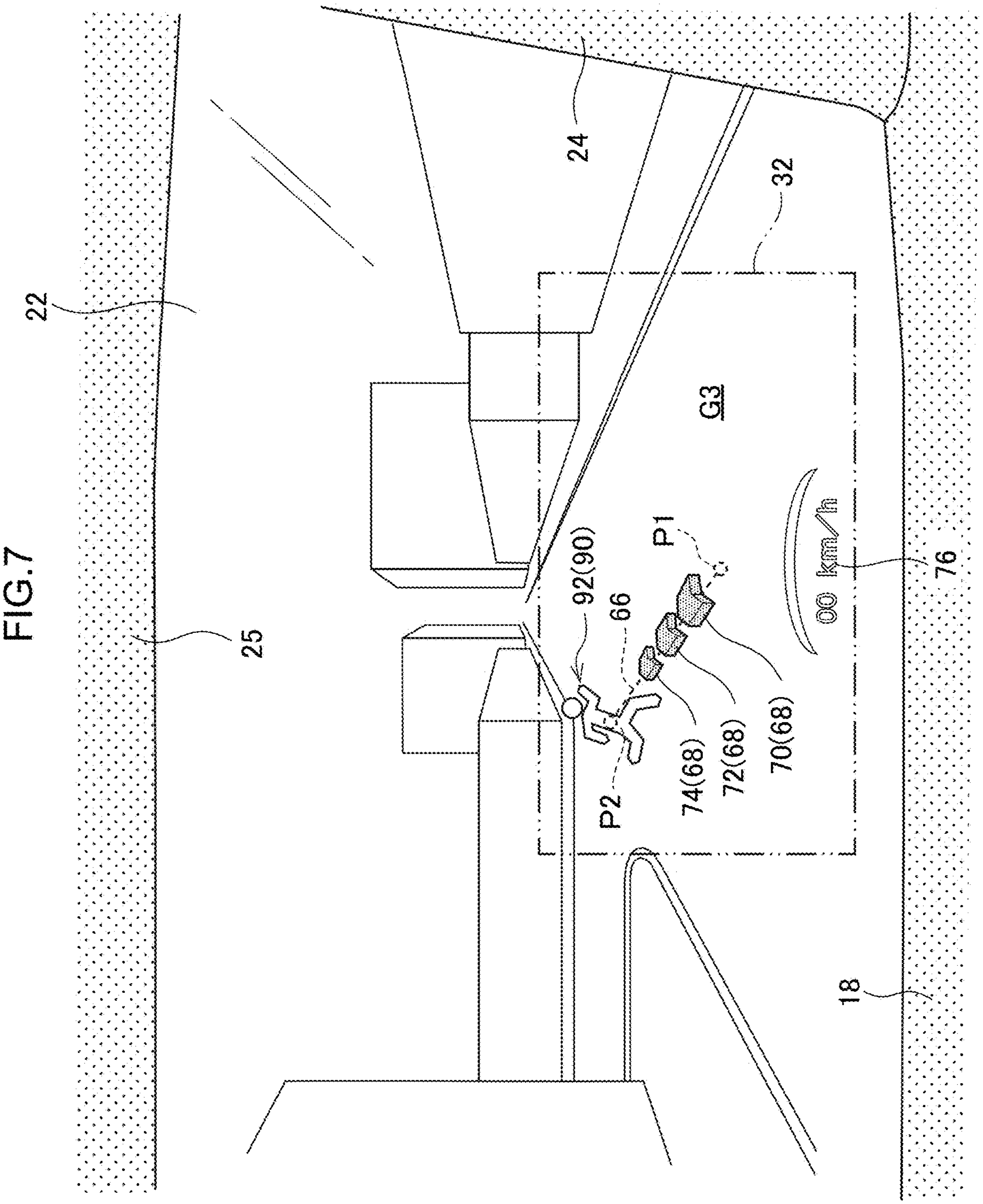
FIG. 7 is a diagram illustrating an example of a display on a display area of a display device according to the first exemplary embodiment, and is a diagram illustrating a case in which a target is in a projection range of a projection section.

Then, as illustrated in FIG. 7, in cases in which the pedestrian 92 is inside the projection range 51A of the projection section 51, the first mark 70, the second mark 72, and the third mark 74 are overlay displayed as virtual images on the third display area G3 of the third display section 32. Namely, the first mark 70, the second mark 72, and the third mark 74 are overlay displayed as virtual images on a forward scene of the windshield 22. Note that although the virtual origin P1, the hypothetical line 66, and position P2 acquired by the positional information acquisition section 54 are illustrated with broken lines for reference in FIG. 7, this information may actually be omitted from display.

Further Characteristic Configuration

The mark generation section 62 is able to generate the marks 68 either to the left or right with respect to the virtual origin P1. More specifically, as illustrated in FIG. 1, in cases in which the pedestrian 92 is outside the projection range 51A of the projection section 51 on the vehicle left side, the mark generation section 62 generates the marks 68 on the left side with respect to the virtual origin P1. In such cases, as illustrated in FIG. 6, the first mark 70 and the second mark 72 are overlay displayed on the left side with respect to the virtual origin P1.

Figure 8:
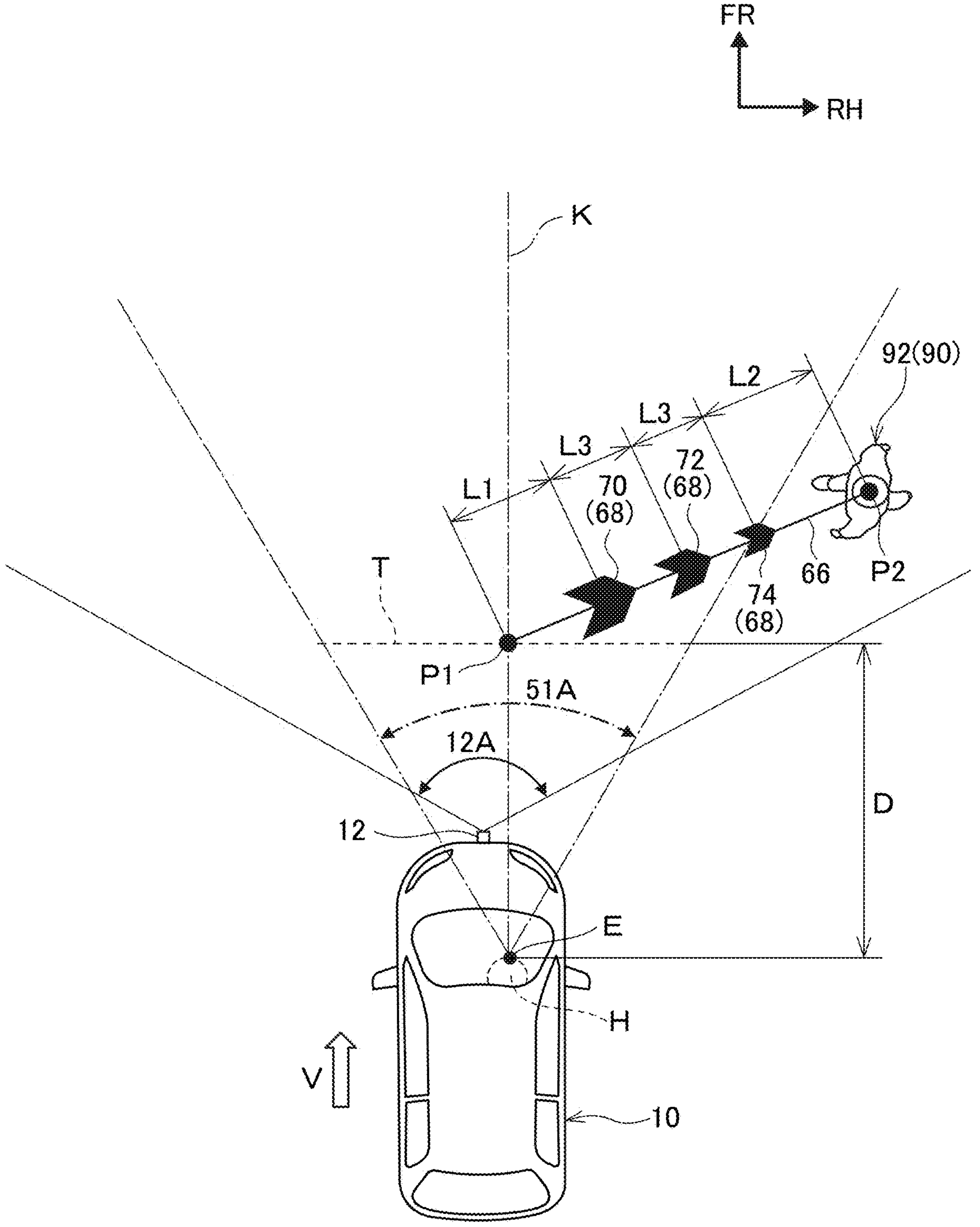
FIG. 8 is a bird's eye view illustrating a vehicle installed with a display system according to the first exemplary embodiment, and is a diagram illustrating a case in which a target is outside a projection range of a projection section.
Figure 9:
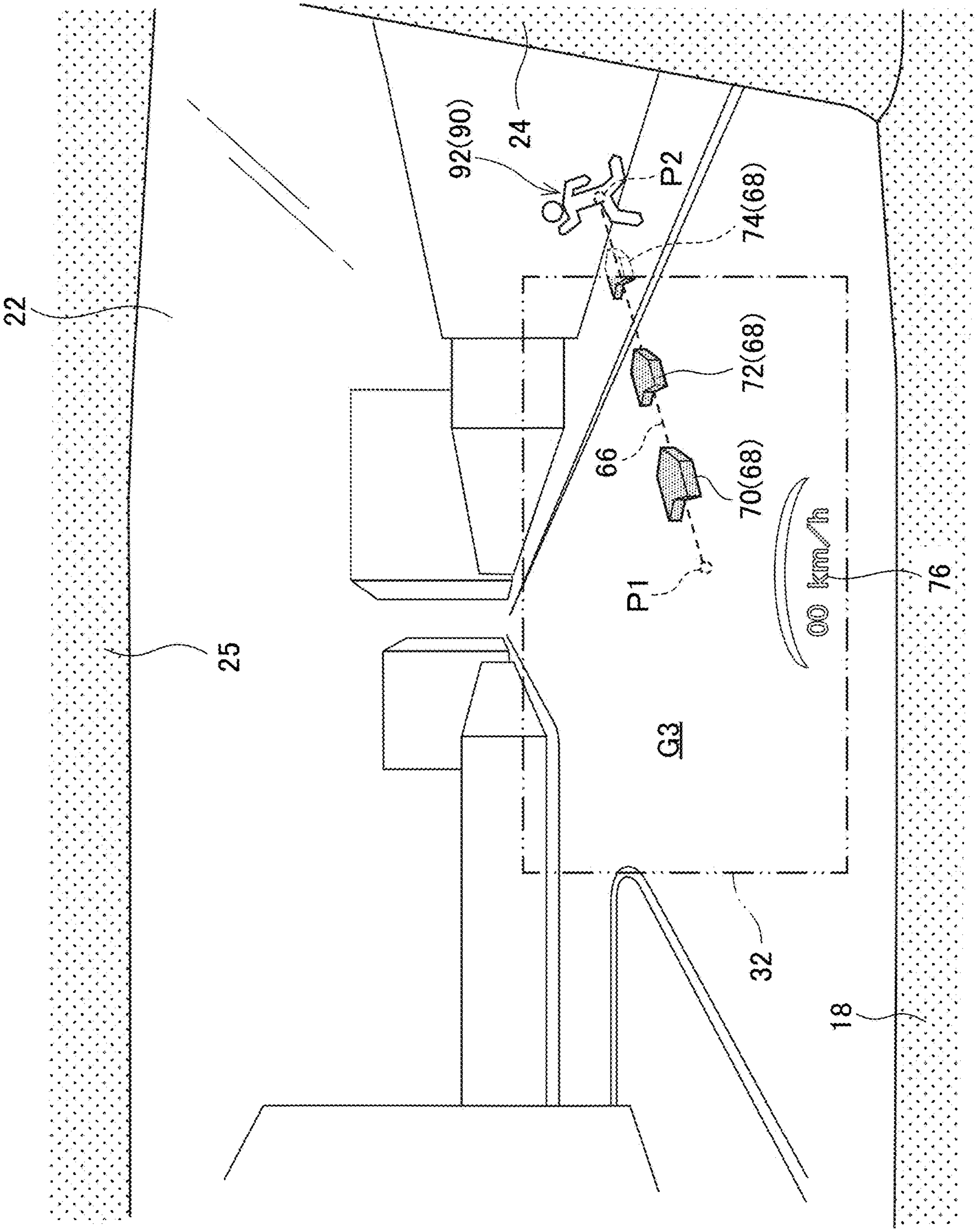
FIG. 9 is a diagram illustrating an example of a display on a display area of a display device according to the first exemplary embodiment, and is a diagram illustrating a case in which a target is outside a projection range of a projection section.

As illustrated in FIG. 8, in cases in which the pedestrian 92 is outside the projection range 51A of the projection section 51 on the vehicle right side, the mark generation section 62 generates the marks 68 on the right side with respect to the virtual origin P1. In such cases, as illustrated in FIG. 9, some out of the first mark 70, the second mark 72, and the third mark 74 are overlay displayed on the right side with respect to the virtual origin P1.

The mark generation section 62 generates a mark 68 at a position near to the virtual origin P1 so as to be larger than a mark 68 at a position far from the virtual origin P1. More specifically as illustrated in FIG. 1 and FIG. 5, the mark generation section 62 generates the first mark 70 at a position near to the virtual origin P1 so as to be larger than the second mark 72 at a position far from the virtual origin P1. The mark generation section 62 generates the second mark 72 at a position near to the virtual origin P1 so as to be larger than the third mark 74 at a position far from the virtual origin P1.

In such cases, as illustrated in FIG. 6 and FIG. 7, the first mark 70 is overlay displayed larger than the second mark 72, and the second mark 72 is overlay displayed larger than the third mark 74.

The mark generation section 62 is able to generate the marks 68 as 3D arrows indicating the direction of the target 90.

The mark generation section 62 is able to generate the marks 68 based on the size of the target 90 as detected by the size detection section 60. More specifically as illustrated in FIG. 1 and FIG. 5, in cases in which the target 90 is a pedestrian 92, the mark generation section 62 is able to generate the marks 68 with a width corresponding to a lateral width of the pedestrian 92. In such cases as illustrated in FIG. 6 and FIG. 7, the marks 68 overlay displayed have widths corresponding to the lateral width of the pedestrian 92.

Figure 10:
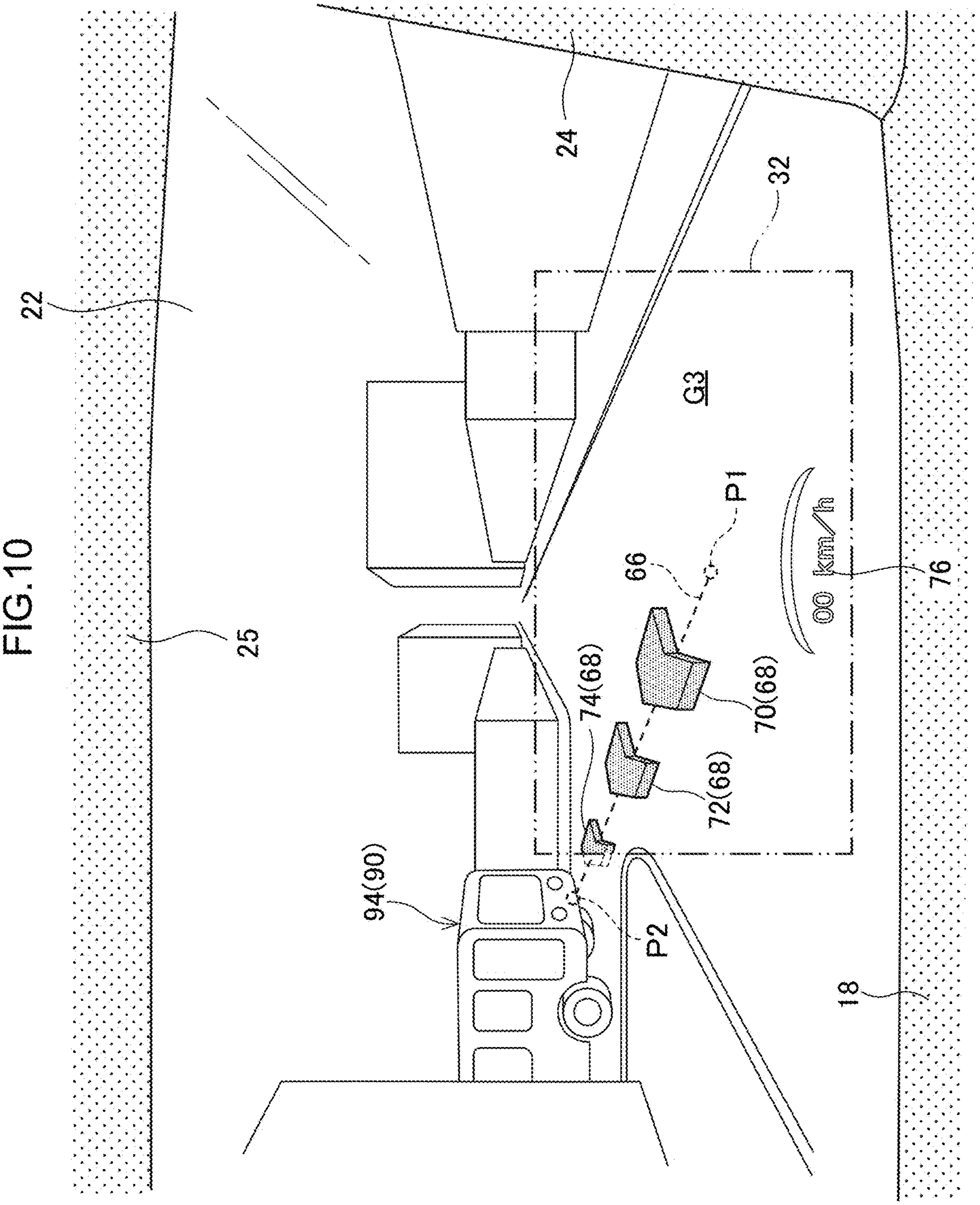
FIG. 10 is a diagram illustrating an example of a display on a display area of a display device according to the first exemplary embodiment, and is a diagram illustrating a case in which a bus serving as a target is outside a projection range of a projection section.

However, in cases in which the target 90 is a bus 94, the mark generation section 62 is able to generate the marks 68 with widths corresponding to the lateral width of the bus 94. In such cases, as illustrated in FIG. 10, the marks 68 overlay displayed have widths corresponding to the lateral width of the bus 94.

The mark generation section 62 may generate a mark to display a velocity V1 of the vehicle 10 as illustrated in FIG. 6, and a mark 76 to display the velocity V1 of the vehicle 10 may be overlay displayed on the third display area G3 of the third display section 32.

Display Device Display Processing Flow

A flow of display processing by the display device 34 will now be described with reference to the flowchart illustrated in FIG. 11.

Figure 11:
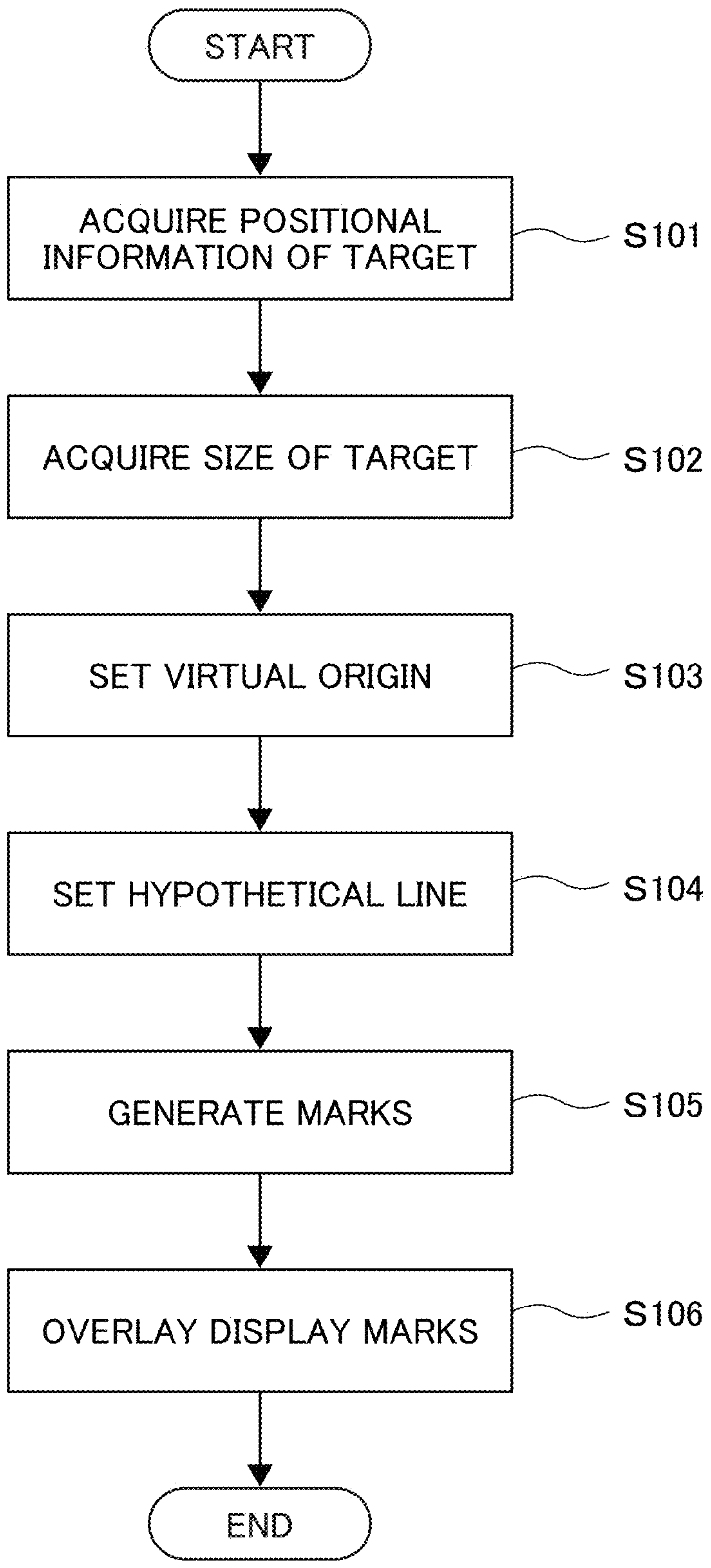
FIG. 11 is a flowchart illustrating a flow of display processing of a display control device according to the first exemplary embodiment.

As illustrated in FIG. 11, when the display processing has been started, the positional information acquisition section 54 acquires the position P2 of the target 90 based on an image of the camera 12 (step S101).

Next, the size detection section 60 detects the size of the target 90 captured in the camera image imaged by the camera 12 based on the camera image (step S102).

Next, the virtual origin setting section 56 sets the virtual origin P1 inside the projection range 51A of the projection section 51 (step S103).

Next, the hypothetical line setting section 58 sets a hypothetical line connecting the virtual origin P1 to the position P2 acquired by the positional information acquisition section 54 (step S104).

Next, the mark generation section 62 generates the marks 68 based on the hypothetical line 66 (step S104).

Next, the information of the marks 68 generated by the mark generation section 62 is output to the projection section 51, the marks 68 are overlay displayed as virtual images on the third display area G3 of the third display section 32 (step S105), and the display processing is ended.

First Exemplary Embodiment Operation and Advantageous Effects

Next, description follows regarding the operation and advantageous effects of the first exemplary embodiment.

The display control device 35 of the first exemplary embodiment includes the positional information acquisition section 54 that acquires the position P2 of the target 90 based on the camera image of the target 90 imaged by the camera 12 in the vehicle 10 forward direction, includes the virtual origin setting section 56 that sets the virtual origin P1 at the inside of the projection range 51A of the projection section 51 having a narrower detection range than the imaging range 12A of the camera 12, includes the hypothetical line setting section 58 that sets the hypothetical line 66 connecting the virtual origin P1 and the position P2 acquired by the positional information acquisition section 54, and includes the mark generation section 62 that generates the marks 68 to urge caution toward the target 90 to overlay display on the third display area G3 provided inside the vehicle cabin based on the hypothetical line 66 (see FIG. 4).

The marks 68 to urge caution toward the target 90 are overlay displayed based on the hypothetical line 66 connecting the virtual origin P1 set inside the projection range 51A of the projection section 51 to the position P2 of the target 90, such that the marks 68 to urge caution toward the target 90 are overlay displayed on the third display area G3 even in cases in which the target 90 has been imaged by the camera 12 outside of the projection range 51A of the projection section 51. This means that information about the direction in which the imaged target 90 is present can still be overlay displayed on the third display area G3 in cases in which the camera 12 has imaged the target 90 outside the projection range 51A of the projection section 51, namely outside an image being displayed on the third display area G3. As a result the occupant H can be aware of the target 90 outside the projection range 51A of the projection section 51.

In the display control device 35 of the first exemplary embodiment, the mark generation section 62 generates the plural marks 68 at a uniform spacings along the hypothetical line 66 (see FIG. 1 and FIG. 5).

The plural marks 68 are overlay displayed at uniform spacings toward the target 90 by the plural marks 68 being generated at uniform spacings along the hypothetical line. This thereby enables the marks 68 to indicate the direction in which the target 90 is present. As a result thereof information about the direction in which the target 90 is present can be transmitted appropriately.

In the display control device 35 of the first exemplary embodiment, the mark generation section 62 generates the first mark 70 at a position near to the virtual origin P1 so as to be larger than the second mark 72 at a position far from the virtual origin P1 (see FIG. 1 and FIG. 5).

The first mark 70 at the position near to the virtual origin P1 is generated larger than the second mark 72 at the far position, with this meaning that, as illustrated in FIG. 6 and FIG. 7, the first mark 70 at the position near to the virtual origin P1 is displayed larger than the second mark 72 at the position far therefrom. This enables the marks 68 to express a sense of depth (sense of perspective). As a result thereof information about the direction in which the target 90 is present can be transmitted more appropriately.

In the display control device 35 of the first exemplary embodiment, the virtual origin setting section 56 sets, as the virtual origin P1, a position offset from the eyepoint E of the occupant H of the vehicle 10 in the vehicle 10 forward direction (see FIG. 1 and FIG. 5).

The virtual origin P1 is at the position offset from the eyepoint E of the occupant H in the vehicle forward direction and so the virtual origin P1 is set based on the eyepoint E of the occupant H. This means that the hypothetical line 66 is set according to the eyepoint E of the occupant H. As a result thereof, the marks 68 can be overlay displayed at appropriate positions on the third display area G3 according to the eyepoint E of the occupant H.

In the display control device 35 of the first exemplary embodiment, the mark generation section 62 generates at least one mark 68 at a position offset at the inside of the projection range 51A of the projection section 51 from the virtual origin P1 in the direction of the position P2 of the target 90 acquired by the positional information acquisition section 54 (see FIG. 1 and FIG. 5).

Due to there being at least one of the marks 68 generated at a position offset from the virtual origin P1 at the inside of the projection range 51A of the projection section 51, the at least one mark 68 is overlay displayed on the third display area G3 even in cases in which the target 90 is present at the outside of the projection range 51A of the projection section 51. This means that information about the direction in which the target 90 is present can be transmitted in cases in which the target 90 is present at the outside of the projection range 51A of the projection section 51.

In the display control device 35 of the first exemplary embodiment, the mark generation section 62 generates the mark 68 at either the left or right with respect to the virtual origin P1 (see FIG. 6 and FIG. 9).

As illustrated in FIG. 1, the marks 68 are displayed at the left side with respect to the virtual origin P1 in cases in which the target 90 is on the vehicle left side outside the projection range 51A of the projection section 51, as illustrated in FIG. 6. As illustrated in FIG. 9, the marks 68 are displayed at the right side with respect to the virtual origin P1 in cases in which the target 90 is on the vehicle right side outside the projection range 51A of the projection section 51, as illustrated in FIG. 8. This means that information indicating whether the target 90 is in the direction toward the vehicle right side or the vehicle left side can be ascertained at a glance. As a result thereof, the speed can be raised with which the occupant H is aware of the direction in which the target 90 is present outside the projection range 51A of the projection section 51.

In the display control device 35 of the first exemplary embodiment, the mark generation section 62 generates the marks 68 as 3D arrows indicating the direction of the target 90 (see FIG. 6 to FIG. 10).

3D arrows pointing toward the target 90 are overlay displayed by generating the marks 68 as 3D arrows. This enables information about the direction in which the target 90 is present to be transmitted more appropriately.

The display control device 35 of the first exemplary embodiment includes the size detection section 60 for detecting the size of the target 90, and the mark generation section 62 generates the marks 68 based on the size of the target 90 as detected by the size detection section 60 (see FIG. 6 and FIG. 10).

The action of generating the marks 68 based on the size of the target 90 is, for example as illustrated in FIG. 10, achieved by generating large lateral width marks 68 when the target 90 has a large lateral width such as a bus 94. However, as illustrated in FIG. 6, small lateral width marks 68 are employed when the target 90 has a small lateral width such as a pedestrian 92. This enables the size of the marks 68 to be set according to the size of the target 90. As a result thereof information about the size of the target 90 at the outside of the projection range 51A of the projection section 51 can be transmitted appropriately.

The display system 16 of the first exemplary embodiment includes the display device 34 and the camera 12 having the imaging range 12A wider that the projection range 51A of the projection section 51 for imaging the target 90 in the vehicle 10 forward direction (see FIG. 1).

The display system 16 includes the display device 34 and the camera 12 having the imaging range 12A wider than the projection range 51A of the projection section 51, and so this enables the information about the direction in which the imaged target 90 is present to be overlay displayed on the third display area G3 even in cases in which the camera 12 has imaged the target 90 outside the projection range 51A of the projection section 51, namely outside the image being displayed on the third display area G3. As a result thereof the presence of the target 90 outside the projection range 51A of the projection section 51 can be transmitted to the occupant H appropriately.

The vehicle 10 of the first exemplary embodiment includes the third display area G3 on the windshield 22 (see FIG. 2).

The marks 68 are displayed on the third display area G3 of the windshield 22, and so the occupant H is aware of the marks 68 when in a state gazing forward. The occupant H is accordingly able to be aware of the marks 68 during driving without shifting from the forward gaze.

Second Exemplary Embodiment

A display system of a second exemplary embodiment differs from the display system of the first exemplary embodiment in that there is a different display area to overlay display the marks to urge caution with respect to the target.

Description follows regarding a configuration of the display system of the second exemplary embodiment. Note that the same terms and reference numerals are employed in the description for portions that are the same as or substantially equivalent to those described in the content of the first exemplary embodiment.

Figure 12:
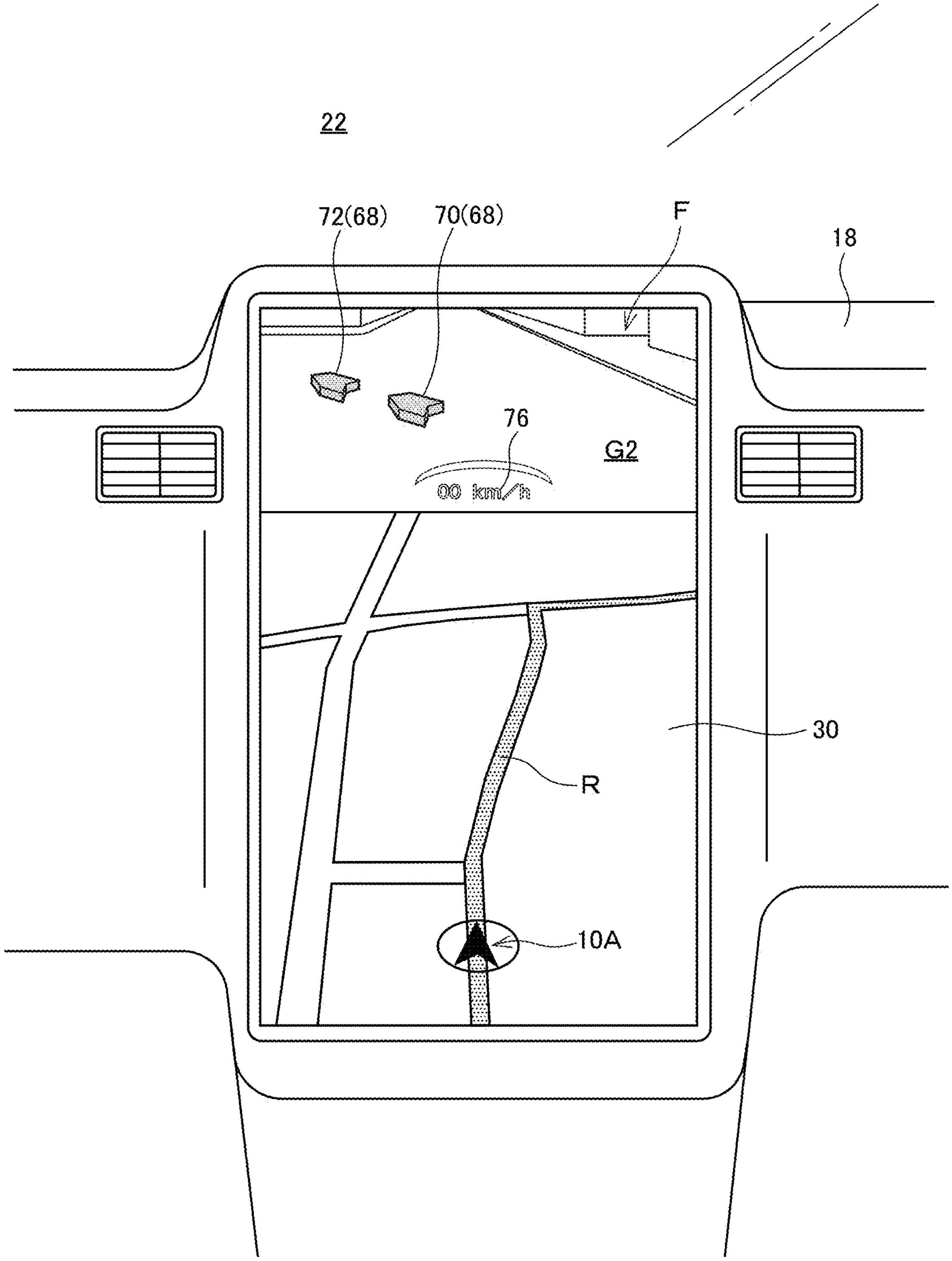
FIG. 12 is a diagram illustrating an example of a display on a display device according to a second exemplary embodiment.

In the second exemplary embodiment, as illustrated in FIG. 12, the marks 68 to urge caution with respect to the target 90 are overlay displayed on a second display area G2 of the second display section 30.

A camera image F imaged by the camera 12 is displayed at an upper side of the second display area G2, and a current position 10A of the vehicle 10 on a map and a route (guidance path) R to a destination is displayed by a navigation system at a lower side of the second display area G2.

An image of the marks 68 generated by the mark generation section 62 are output to the second display section 30 serving as an output section, and the marks 68 are overlay displayed on the second display area G2.

Similar operation and advantageous effects to those of the display system of the first exemplary embodiment can be exhibited even in such a configuration.

This completes a description of a display system of the present disclosure based on the above exemplary embodiments. However, the basic configuration is not limited to those of the exemplary embodiments, and various design modifications and the like are permitted thereto within a scope not departing from the spirit of the present disclosure.

In the above exemplary embodiments an example was illustrated in which the positional information acquisition section 54 acquires positional information about the target 90 based on a camera image in which the target 90 is imaged by the camera 12 in the vehicle 10 forward direction. However, the positional information acquisition section may acquire the positional information about the target based on a camera image of a camera for detecting a target anywhere in the surroundings of a vehicle.

In the exemplary embodiments described above examples were illustrated in which the camera 12 served as a target detection section. Further, in the exemplary embodiments described above examples were illustrated in which the projection range 51A, as an output range, of the projection section 51, as an output section, is narrower than the imaging range 12A, as a detection range, of the camera 12, as a target detection section. However, the target detection section is not limited to such a mode and, for example, may be a radar, LiDAR, sonar, or the like, as a target detection section. In addition, an output range of an output section is not always narrower than a detection range of a target detection section. In accordance with an arrangement of a radar, LiDAR, sonar, or the like, the projection range 51A, as an output range, of the projection section 51, as an output section, can be wider than a detection range of a radar, LiDAR, sonar, or the like, as a target detection section.

In the above exemplary embodiments described above examples were illustrated in which the hypothetical line setting section 58 sets the hypothetical line 66 connecting the virtual origin P1 and the position P2 of the pedestrian 92 together in a horizontal plane including the virtual origin P1. However, the hypothetical line setting section may set a hypothetical line connecting the virtual origin P1 and the position P2 of the pedestrian 92 together in three dimensional space.

In the exemplary embodiments described above examples were illustrated in which the size detection section 60 detects a size of the target 90 captured in the camera image imaged by the camera 12 based on the camera image. However, the size detection section is not limited to such a mode and, for example, may detect the size of the target based on detection information from radar, LiDAR, sonar, or the like.

In the exemplary embodiments described above examples were illustrated in which the mark generation section 62 changes the distance between the plural marks 68 according to a distance to the target 90. However, a mark generation section may employ a fixed distance between marks irrespective of the distance to the target. Moreover, the mark generation section may be configured to change a color and size of marks generated according to a distance to a target. This thereby enables information about the distance to the target to the transmitted.

In the exemplary embodiments described above examples were illustrated in which the marks to urge caution toward the target were overlay displayed in cases in which the target 90 was outside and inside the projection range 51A of the projection section 51. However, a configuration may be adopted in which marks to urge caution with respect to the target are overlay displayed only in cases in which a target is outside an projection range of a projection section, or a configuration may be adopted in which marks to urge caution toward the target (marks displaying a position of the target) are overlay displayed only in cases in which the target is inside the projection range of the projection section.

In the exemplary embodiments described above examples were illustrated in which the mark generation section 62 generates the marks 68 as 3D arrows indicating the direction of the target 90. However, the mark generation section may generate two dimensional arrows, or may generate shapes other than arrows (for example, spheres or triangular pillars).

In the exemplary embodiments described above examples were illustrated in which the virtual origin P1 is a point of intersection of a straight line K extending from the eyepoint E of the occupant H of the vehicle 10 ahead of the vehicle where it intersects with the virtual image plane T. However, the virtual origin is not limited to such a mode, and may be set anywhere within the output range of the output section.

In the exemplary embodiment described above examples were illustrated in which the mark generation section 62 generates the marks 68 based on a lateral width of the target 90 as detected by the size detection section 60. However, the mark generation section may generate the marks based on a height, or length of the target as detected by the size detection section.

In the first exemplary embodiment described above an example was illustrated in which an image of the marks 68 generated by the mark generation section 62 is projected onto the third display section 32 of the windshield 22. In the second exemplary embodiment, an example was illustrated in which an image of the marks 68 generated by the mark generation section 62 is displayed onto the second display section 30. However, the image of the marks generated by the mark generation section may be displayed on the first display section 28, or may be projected onto a combiner provided at an upper face of the instrument panel.

In the exemplary embodiment described above examples were illustrated in which the display system of the present disclosure is applied to a vehicle 10 traveling forward. However, the display system of the present disclosure may be applied to a vehicle traveling around a curve, a vehicle traveling around a street corner, or applied to a stationary vehicle.

In the exemplary embodiment described above examples were illustrated in which the processing performed in the display control device 35 was software processing performed by executing a program, however there is no limitation thereto. For example, processing performed by hardware may be employed. Or, processing executed by a combination of software and hardware may be employed. Moreover, in cases in which software processing is employed, the program may be distributed stored on various types of non-transitory storage medium such as a compact disc read only memory (CD-ROM), a digital versatile disc read only memory (DVD-ROM), a universal serial bus (USB) memory, or the like, and executed by a processor such as the CPU 36 or the like. The program may also be provided in a format downloadable from an external device over a network.

What is claimed is:

1. A display control device comprising:

a memory, and a processor coupled to the memory, wherein the processor is configured to:

acquire positional information about a target based on detection information of a target detection section that detects the target in surroundings of a vehicle;

set a virtual origin in an output range of an output section that outputs an image to a display area provided in a cabin of the vehicle;

generate a plurality of marks that urge caution toward the target at a portion between the virtual origin and a position of the positional information, and change a virtual distance between the plurality of marks according to an actual distance from the vehicle to the target.

2. The display control device of claim 1, wherein the processor is configured to generate the mark at a position near to the virtual origin so as to be larger than the mark at a position far from the virtual origin.

3. The display control device of claim 1, wherein the processor is configured to set a position offset from an eyepoint of an occupant of the vehicle in a forward direction of the vehicle as the virtual origin.

4. The display control device of claim 1, wherein the processor is configured to generate at least one of the mark at a position offset from the virtual origin toward a position of the positional information and lying in the output range.

5. The display control device of claim 1, wherein the processor is configured to generate the mark at either left or right with respect to the virtual origin.

6. The display control device of claim 1, wherein the processor is configured to generate the mark as a 3D arrow indicating a direction of the target.

7. The display control device of claim 1, wherein the processor is further configured to detect a size of the target, and the processor generates the mark based on the size of the detected target.

8. A display device comprising:

the display control device of claim 1;

the output section that outputs the image; and the display area provided in the cabin of the vehicle, on which the image output by the output section is overlay displayed.

9. A display system comprising:

the display device of claim 8; and the target detection section that detects the target in the surroundings of the vehicle and has a detection range wider than the output range output by the output section.

10. A vehicle comprising:

the display system of claim 9; and a windshield that configures the display area.

11. A display control method executed by a processor, the display control method comprising:

acquiring positional information about a target based on detection information of a target detection section that detects the target in surroundings of a vehicle;

setting a virtual origin in an output range of an output section that outputs an image to a display area provided in a cabin of the vehicle;

generating a plurality of marks that urge caution toward the target at a portion between the virtual origin and a position of the positional information, and changing a virtual distance between the plurality of marks according to an actual distance from the vehicle to the target.

12. A non-transitory storage medium storing a program executable by a processor to perform display control processing, the display control processing comprising:

acquiring positional information about a target based on detection information of a target detection section that detects the target in surroundings of a vehicle;

setting a virtual origin in an output range of an output section that outputs an image to a display area provided in a cabin of the vehicle;

generating a plurality of marks that urge caution toward the target at a portion between the virtual origin and a position of the positional information, and changing a virtual distance between the plurality of marks according to an actual distance from the vehicle to the target.

* * * * *